United States Patent [19]

Henning

[11] Patent Number: 4,489,602
[45] Date of Patent: Dec. 25, 1984

[54] ROD-LIKE APPARATUS FOR DETERMINING THE EXISTING LEVEL OF LIQUIDS IN CONTAINERS, CHANNELS, OR THE LIKE

[76] Inventor: Wolfram Henning, Neumarkter Strasse, 8501 Allersberg (BRD), Fed. Rep. of Germany

[21] Appl. No.: 440,402

[22] Filed: Nov. 9, 1982

[30] Foreign Application Priority Data

Nov. 10, 1981 [DE] Fed. Rep. of Germany ....... 3144541

[51] Int. Cl.³ .............................................. G01F 23/02
[52] U.S. Cl. ..................................... 73/327; 350/96.23
[58] Field of Search ............... 73/293, 327; 350/96.15, 350/96.20, 96.23

[56] References Cited

U.S. PATENT DOCUMENTS

| 2,620,660 | 12/1952 | Goldsmith | 73/327 X |
| 3,384,885 | 5/1968 | Forbush | 73/293 X |
| 3,448,616 | 6/1969 | Wostl et al. | 73/293 |
| 3,884,171 | 10/1974 | Rodger | 73/293 |
| 4,151,747 | 5/1979 | Gottlieb et al. | 356/44 X |
| 4,287,427 | 9/1981 | Scifres | 73/293 X |

FOREIGN PATENT DOCUMENTS

| 56-8514 | 1/1981 | Japan | 73/293 |
| 56-42658 | 11/1981 | Japan | 73/293 |

*Primary Examiner*—Daniel M. Yasich
*Attorney, Agent, or Firm*—Thomas & Kennedy

[57] ABSTRACT

A rod-like apparatus for determining the existing level of liquids in containers, channels or the like has a lightguide 1 to be arranged in a container and comprising a core of a transparent material with a first refractive index and also a transmitter 14 and a receiver 15 for light to be sent through the lightguide 1. In order to be able to measure changes in the filling height in the container in a quasi-analog or analog manner, the lightguide 1, which may have a cladding, is wound about a rod-shaped carrier body of non-uniform cross-section. The non-uniform regions of the carrier body 5 have a form such that the lightguide 1 is shaped so that at the particularly curved regions 10 the conditions for total reflection hold when ambient air is present, while on wetting with liquid the conditions fall below those for total reflection so that light emerges into the liquid.

8 Claims, 9 Drawing Figures

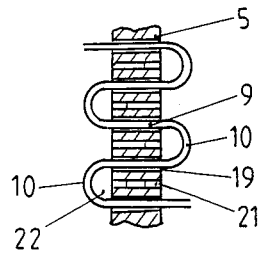
Fig. 5
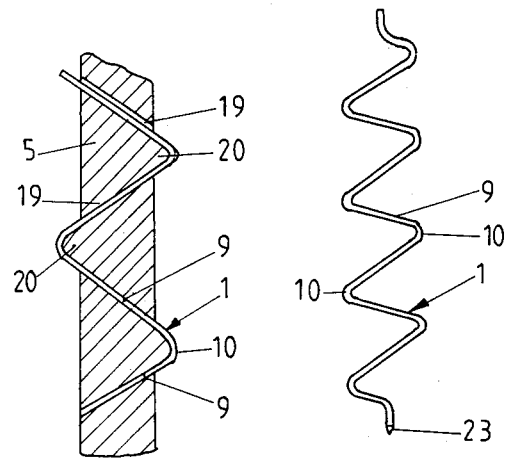
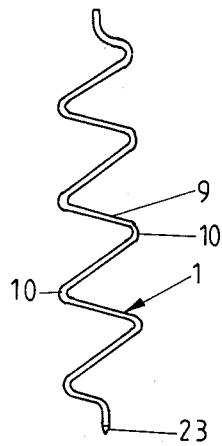
Fig. 6
Fig. 7
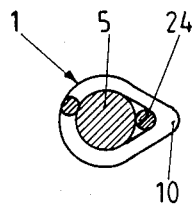
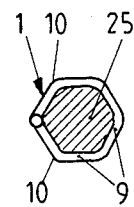
Fig. 8
Fig. 9

ROD-LIKE APPARATUS FOR DETERMINING THE EXISTING LEVEL OF LIQUIDS IN CONTAINERS, CHANNELS, OR THE LIKE

The invention relates to a rod-like apparatus for determing the level of liquids in containers, channels, or the like, with a lightguide arranged in the container and made of a transparent material with a first refractive index and also with a transmitter and a receiver for light to be sent through the lightguide. The apparatus operates with electromagnetic radiation, for example with visible light, infrared radiation, etc.

Lightguides are known. They consist of a rod-like or cable-like material, and in fact of a core material and a cladding material covering the core about its entire periphery. Different kinds of glass and/or plastics can be used for the core and cladding. It is important that the core material and the cladding material have different refractive indices; the refractive index of the cladding material must be smaller than that of the core material. Light entering the end faces from, for example, a transmitter is then conducted along the lightguide by total reflection at the boundary surfaces between the core and the cladding.

The use of such rod-like lightguides for determining the existing level of liquids is known, e.g., from DE-OS Federal German Offenlegungsschrift No. 1,548,983. There, in the simplest form, a single such lightguide, without cladding, is provided with a transmitter at one end and a receiver at the other end. The lightguide is of a curved shape, with a tip facing downwards, and is built such that the material of the lightguide or core forms a point. With such a device, a liquid level can be detected only in the region of this point. If the curved point is wetted by the liquid, the light abruptly emerges so that the receiver at the other end of the lightguide receives comparatively low light power. Thus, a go/no-go detection is possible since the point of the lightguide is wetted in exactly the same way however far the level of the liquid is above the point. Such a device has the particular disadvantage that a drop of liquid often remains hanging on the tip when the liquid level falls, so that light is thus also partially caused to emerge at this place, although the liquid level has fallen further. Inaccuracies and erroneous determinations result from this.

An apparatus operating in analog fashion, of the kind previously described, is known from U.S. Pat. No. 3,448,616 in which a transmitter and receiver are arranged at one side of a lightguide. For the lightguide itself there is used a conically pointed glass body which is constructed at its free end such that total reflection occurs there. The conical surface of this glass body gives rise, as regards conduction of light of a light beam sent from one end into the cone, and totally reflected multiple times at the wall, to a reduction of the angle of incidence at any given reflection point with each total reflection. Contrary to this, for a light beam which has been reflected in the region of the conical tip and moved into the glass body in the direction of its widening, the circumstances are reversed, in fact such that for each successive reflection an increase in the angle of incidence occurs in comparison with the previous reflection. Only those light beams can be detected by the receiver with this arrangement, and used for evaluation, which are directed, as regards their angle of incidence, such that they at least reach the tip of the cone and are totally reflected there. Light beams, which already exceed the limiting angle for total reflection on passing for the first time through the conical glass body before reaching the conical tip, thus assume a smaller angle of incidence than the limiting angle, and emerge at the place concerned from the glass body, and in fact equally so whether this place is wetted with the liquid to be measured or not. From the beginning this part of the light is not usable for the measurement. On the other hand the light which is totally reflected at relatively large angles of incidence can also not be used for a measurement since with respect to this angle also, the wetting of the glass body with a liquid does not change the refraction conditions so far that total reflection is suppressed and light is passed out of the lightguide. With this known apparatus an analog determination of the level can in fact be achieved, but only those light beams are suitable for use which lie, as regards their angle of incidence, between the two groups of light beams described, and which thus do not fall below the limiting angle in the region of the tip of the glass body, but approach it. It is only for such light beams that the liquid, by wetting the glass body, suppresses the total reflection and causes light to pass out of the glass body into the liquid. However, this furthermore means that the known apparatus comes to have a good accuracy of measurement in the region of the tip of the cone, while the accuracy rapidly decreases in the direction towards the wide end of the conical glass body, and in fact such that the glass body is suitable for measurement purposes only in a relatively small region adjacent to the vertex. If this region is to be extended corresponding to the different levels, it is unavoidable that the conical glass body has to be produced and used with greater dimension, in particular, a greater diameter. However, limits are of course set here, in particular when the wide side of the conical glass body would have to assume a greater diameter than the corresponding width of the container at this place. The use of this device is thus restricted to small differences in filling level. It does not appear possible to measure differences in level with it such as occur, for example, in a motor vehicle fuel tank or even in a washing machine.

DE-AS Federal German Auslegeschrift No. 2,804,639 shows, in FIG. 2, an embodiment of a level indicator for liquids or fluids in a container, the operation of which is reliable. Here a rod is used with light-conducting properties and provided at its periphery with circumferential grooves which are arranged at regular spacings over the length of the rod. The circumferential grooves serve the purpose of deflecting outward from the rod into air, and thus without wetting, by refraction and partial reflection, light beams incident there. Deflection does not occur in the region of the liquid since the grooves are filled with the liquid and other refraction conditions hold there. This apparatus thus operates exactly contrary to the object of the application, but has the advantage that a direct measurement of the level of filling can be achieved. To be effective, the grooves must be polished with high accuracy of production, and the rod must also have a certain thickness. Besides being expensive to produce, this level indicator also has low sensitivity at low levels of filling since a particularly large part of the light will have already emerged. A quasi-analog determination of the filling level is in fact measurable, but low sensitivity occurs just where, e.g., with a nearly empty gasoline tank of a motor vehicle, an accurate and dependable indication is of importance.

An object of the invention is to improve upon an apparatus of the kind previously described so as to render it suitable for analog or quasi-analog determination of filling level such that it can be used even with large changes in level and permit sufficient accuracy even over large heights of measurement or large changes in filling level. At the same time the apparatus is to be constructed simply with the capability of being produced at lost cost.

This is achieved according to the invention in that a lightguide, which may have a cladding, is wound onto a rod-shaped carrier body of non-uniform cross-section, with the non-uniform regions of the carrier body possessing a shape such that the lightguide receives a form such that at particularly curved regions conditions for total reflection hold when ambient air is present, while upon being wetted with liquid, on the other hand, the conditions fall below those for total reflection so that light emerges into the liquid. A chief advantage of this apparatus is that the lightguide does not need to be further processed after being produced, and thus in particular does not need to be ground; it is only necessary to give this lightguide a shape in which it has particularly curved regions. The curvature of these regions is chosen such that at each curve there exist a certain proportion of light rays having an angle of incidence in the region of the limiting angle for total reflection and in fact such that, suited to the liquid to be measured, total reflection takes place when the curved regions are in contact with air, but when they are wetted with liquid light emerges from the lightguide into the liquid. In this manner a weakening of the light passing through the lightguide occurs. Residual light remaining in the lightguide is an inverse measure of the filling level in the container. While a lightguide generally has the object of guiding input light within the lightguide with as little loss as possible, in the present invention the lightguide is given a quite special shape with particularly curved regions where, upon being wetted with liquid to be measured, part of the light is guided out of the lightguide into the liquid, while in the region of the lightguide which is above the level of the liquid only normal light loss occurs in the lightguide. For example, if a container is largely empty, the conditions for emergence of light are only reached at a small part of the length of the lightguide so that residual irradiation at the receiver represents a relatively large proportion of the radiation supplied into the lightguide by the transmitter. This inverse indication must be reinverted with suitable means in order to indicate or display the actual filling height. This is relatively easy to carry out. Apparatus according to the invention can be constructed to operate in an analog or quasi-analog manner and permit measurement of even relatively large changes in filling level, as occur, for example, in the fuel container of a motor vehicle or in the drum of a washing machine. The lightguide or the apparatus possesses, over its length, approximately equal width so that its insertion into a container presents no problems. Total reflection conditions at the lightguide can be varied continuously or intermittently. Also, a discontinuous change and/or a continual or a constant change are possible. A strictly continuous change leads to an analog determination. A discontinuous change leads to a quasi-analog determination. A linearization of the residual radiation can be obtained by the kind of change, for example, by an intermittent change. By specially shaping the lightguide the container shape can be taken into account also, with cross-section changing with height, e.g. as in a motor vehicle.

Advantages of the rod-like apparatus are as follows:

The cost, in comparison with prior art apparatuses using lightguides to determine existing level of liquid, is considerably reduced. Lightguides can be conventionally produced at favorable prices. In the present apparatus they do not have to be further processed; in particular, it is not necessary to grind away or eliminate parts of the lightguide partially over the periphery. The lightguide can thus be used as it is, when produced in a normal manner. The apparatus can be used with varied liquids; the refractive index of the liquid to be measured can be greater or smaller than that of the core material or even the material of the cladding. Accuracy of measurement is constant over the length of the lightguide or can be chosen to be constant by corresponding construction. Likewise, it is also possible to provide regions of particular interest with increased accuracy of measurement. The apparatus operates without electrical voltage and has no moving parts. Thus, it is wear-free and free from disturbance, even from electric fields. An analog or at least a quasi-analog indication can be obtained over its length. No great cost is involved in linearizing the determination or matching the measurement value for the liquid to a predetermined container shape. The material of the lightguide, which is preferably plastic or glass, can be matched to various uses, in particular to the liquid involved.

The non-uniform regions on the rod-shaped carrier body can be formed by projections, pegs or the like, or by apertures in the carrier body, and the lightguide mounted on the carrier body wound between the projections or apertures, so that straight regions of lightguide are followed by regions with a particular curvature. Only the regions with the particular curvature, which can be varied according to the use in a given case, are used for the measurement proper while the straight regions of lightguide do not cause light to emerge, whether air or liquid is in contact there.

Lightguides are appropriately used which have a cladding as well as a core, with the refractive index of the material of the core being greater than that of the material of the cladding. The cladding then plays an essentially protective role. It evenly seals the smooth surface of the core and projects this against deposition of dirt particles or the occurrence of cracks on the surface, etc.

The lightguide can be wound onto the carrier body under tension to achieve particularly curved regions of the lightguide. This tension does not have to be particularly large but only has to ensure that the curved lightguide regions assume a respective clearly defined curvature by abutment on the projection or aperture. The tension of the lightguide can be variable on the carrier body. It is thereby possible to set the lightguide itself under tension with an apparatus which operates adjustably, in this manner to permit a readjustment or also to achieve a null point equalization.

To increase measurement accuracy, the lightguide can be constructed as thin fibers which follow the shaping form of the carrier body, in particular at the regions of the special curvatures. While in the state of the art a conical glass body can assume considerable dimensions, the mesurement accuracy is increased with the object of the application when a particularly thin fiber is selected as the lightguide; thus, their diameter can be smaller than 1 mm. Such fibers can likewise be easily bent or laid in curves without fine cracks thereby occurring in their surface causing disturbances due to undesired light losses.

The projections and/or apertures can be provided at different mutual spacings and/or with different roundness. All the geometrical conditions can thus be varied and matched to the respective case of use. In particular, the same fibers can be used as lightguides in different apparatuses for different application purposes.

It is even possible to give the lightguide a permanent shape after being wound on the carrier body and to utilize it detached from the carrier body. This is possible, for example, with a lightguide of a glass thread which is wound in a hot state about a carrier body so that after cooling it permanently assumes this shape. The lightguide can then be removed from the carrier body and appropriately be placed in a protective sheath or the like for use, while the carrier body is available for winding a further lightguide for production.

In a particular embodiment, the lightguide can be wound around downwards and upwards on a carrier body, about a series of projections, pegs, etc., giving the same downwards and upwards curvatures for the lightguide, and apart from this providing the advantage that both the transmitter and the receiver can be arranged outside the liquid to be measured. It can be appropriate to deflect the lightguide at the lower reversal point, and thus at half length, with a larger curvature than that of the particular curvatures. However, it is also possible that the lightguide may be wound around the carrier body in one direction about only one series of projections, pegs, etc., for example downwards, and that the lightguide extends straight back. The mesurement length is only passed through once by light, with attenuation, while only the natural losses of light occur in the lightguide in the straight shape, and are irrelevant for the measurement. Here the projections, pegs, or the like can be mutually offset vertically or horizontally in order to influence the shape of the particularly curved regions.

In a particularly simple embodiment of the invention a lightguide of usual construction, i.e. with a cladded core, is wound onto a carrier body with non-uniform cross-section so that at the places where the cross-section of the carrer body departs from the circular form curved regions exist whose geometry must, of course, be established. Here, only the corresponding geometrical conditions must be maintained as needed to suit the special application case.

The invention is explained and further described below with reference to the drawing, with respect to several embodiment example. The Figures show:

FIG. 5 is a cross-section through the apparatus in a further embodiment;

FIG. 6 is an example of a further possibility;

FIG. 7 is the lightguide as the essential element of the apparatus as a heat-shaped glass rod;

FIG. 8 is a horizontal section through a further embodiment of the apparatus; and FIG. 9 is a horizontal section through a last embodiment of the apparatus.

Figure 1:
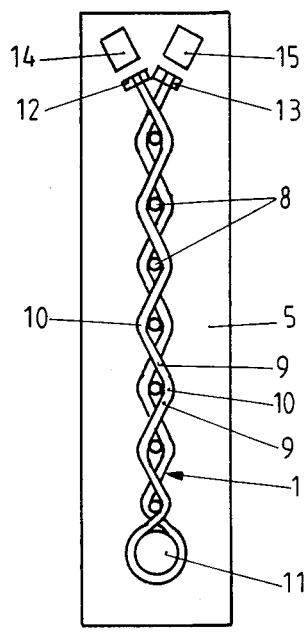
FIG. 1 is a view of the apparatus in a first embodiment.

A lightguide is shown in FIG. 1 which has a round cross-section extending concentrically of a middle axis 2 (FIG. 2) and either consisting of a core 3 of a transparent material, for example of glass, quartz, plastic, or the like, or additionally sheathed with cladding 4, which likewise consists of a transparent material. The materials of the core 3 and cladding 4 have different refractive indices. The refractive index $n_1$ of the core is greater than the refractive index $n_2$ of the cladding 4. The conditions of total reflection of light rays or, in general, electromagnetic radiation, within the lightguide 1 (FIG. 2) are $$n_1 \cdot \sin \alpha_1 \cdot \sin \alpha_2$$

For total reflection limiting angle, $$\alpha_2, \text{set} = 90° = \sin \alpha_2 - 1$$

for $\alpha_2 = 90°$ $\sin \alpha_2 = 1$ thus holds. $\alpha_1$ denotes the limiting angle for total reflection. The refractive index $n_3$ of air is $=1$. This refractive index of air is thus smaller than the refractive index $n_1$ or the refractive index $n_2$ of the materials of the lightguide. The refractive index $n_4$ of a liquid 7 in a container or the like is as a rule smaller than the refractive index $n_1$ of the core 3, but can or course also be greater.

The lightguide 1 is wound on the carrier body 5 about projections, pegs, or the like 8 in the manner shown in FIG. 1, and in fact from top to bottom and bottom to top, so that the lightguide has alternate straight regions 9 and curved regions 10, the curves being particularly shaped. It will be understood that light in the straight regions is always subject to the conditions for total reflection, while these conditions change in the curved regions, and in fact in dependence on whether the respective curved region 10 is surrounded with air 6 or with liquid 7. The projections, pegs, or the like 8 are arranged, in the embodiment according to FIG. 1, at equal spacings so that at the respective places on the lightguide 1 the curved regions are identical to each other. It will be understood that the number, diameter, and respective spacing of the pegs 8 can be varied. At the lower end is provided a deflecting peg 11, about which the lightguide 1 is wound with a relatively large curvature. The two free ends of the lightguide 1 can appropriately be held in fixing pieces 12, 13 such that the lightguide 1 is wound under slight tension about the series of pegs, projections, or the like 8, and such that the lightguide 1 is unequivocally laid against the projections 8 and hence the curved regions 10 have an unequivocal shape. A transmitter produces and emits electromagnetic radiation, in particular light, into the lightguide 1, while a receiver 15 is provided to receive the residual radiation. The receiver 15 can be a photodiode.

Figure 2:
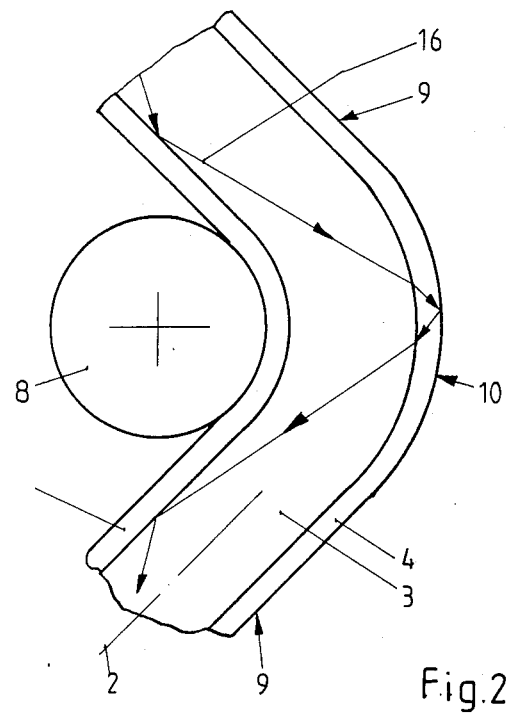
FIG. 2 is an enlarged representation of a curved region of the lightguide when in contact with air.
Figure 3:
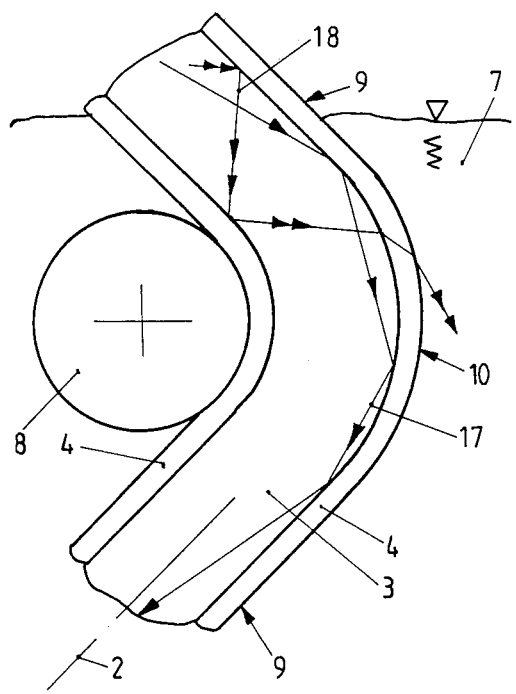
FIG. 3 is a similar detailed representation as FIG. 2, but when wetted with liquid.

The mechanics of operation of the invention is explained with reference to FIGS. 2 and 3. A single curved region 10 of the lightguide 1 is shown here, such as arises in the region of a projection, peg, or the like 8. Two straight regions 9 necessarily adjoin this curved region. A light ray 16 is shown, such as is inputted into the lightguide 1. Cross-hatching of the lightguide is omitted for reasons of clarity. As can be seen, this light ray 6 first meets the conditions for total reflection in the upper straight region 9, and in fact at the boundary layer between the core 3 and the cladding. In the adjoining curved region 10, however, this light ray can emerge from the core 3 into the cladding 4. However, the conditions for total reflection still hold at the contact surface between the cladding 4 and the surrounding air 6, so that this light ray 16 again enters the core 3 and is there passed on into the adjoining straight region 9, also within the core 3. Of course there are other light rays which pass through the curved region 10 only within the core 3. However, these are of no interest fo the measurement at this special curved region 10, but this does not exclude the possibility that they meet, in the next curved region or another curved region 10 such conditions as those met by the light ray 16 in FIG. 2. Such a light ray, not utilized for measurement in the special curved region 10, is shown in FIG. 3 as the light ray 17. Another light ray 18 is shown for comparison which indicates exceeding the reflection conditions on wetting with the liquid 7 in the curved region. This light ray 18 is thus conducted out of the lightguide 1 into the liquid 7 and hence contributes to the attenuation of the residual light which is measured at the receiver 15. These processes are present in the same way at all curved regions 10 of the lightguide 1, so that a constant, high accuracy of measurement results over the whole length or height of the lightguide 1 or the apparatus. Of course, the curvature in the regions 10 must be respectively matched to the application case.

Figure 4:
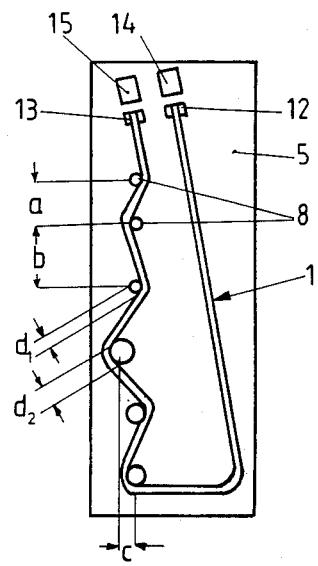
FIG. 4 is an apparatus of another possible arrangement.

FIG. 4 shows a further possible embodiment of the lightguide on a carrier body 5. Reference is made to FIG. 4 to make it clear that the projections, pegs, or the like 8 can have different diameters d1, d2 and can be offset in the vertical direction with different mutual spacings a and b and also in the horizontal direction by different amounts c. It will be understood that great flexibility arises from these geometrical possibilities of embodiment to establish the curvature in the curved regions 10 precisely and to locate them spatially. The lightguide 1 is, according to FIG. 4, brought upward in a straight section, so that no special loss of light any longer occurs here. The lightguide 1 itself preferably consists of a core 3 and cladding 4. However, it is also possible to use only a single material, thus only a core 3, and to allow air to form the cladding, as it were. In a simplified representation, the lightguide 1 is respectively shown in FIGS. 5–9 only by a single line, although here also, of course, a jacket 4 can be provided, if necessary.

FIG. 5 shows a cross-section through the carrier body 5. The body here has apertures 19, which can themselves be shaped or also, as shown here, provided in association with rib-shaped knobs 20. It is always important that the lightguide 1 have straight regions 9 and curved regions 10, or be brought into such a form.

FIG. 6 shows a possible embodiment in which recesses 21 are provided in the carrier body 5 for insertion of semicircular extension regions 22 adjoined to the apertures 19, so that the lightguide can thus be drawn into the shape shown through the carrier body 5. Of course, the carrier body 5 can be produced from one piece also.

FIG. 7 shows a view of a lightguide of a heat-shaped and hence permanently formed glass rod, which can be used detached from a carrier body 5, so that the carrier body 5 can be used again for production of such light guides. The transmitter 14 and receiver 16 are also here appropriately arranged at one end of the lightguide 1 while the other end carries a ridge prism 23 so that the conditions for total reflection are maintained there. Of course, it is also possible to arrange the transmitter 14 at one end and a receiver 15 at the other end of the lightguide.

FIGS. 8 and 9 show horizontal sections through other embodiments of the apparatus. According to FIG. 8, another carrier body 24, likewise with a circular cross-section, but of smaller diameter, is arranged next to a first carrier body 5 with a circular cross-section. Both carrier bodies can also be constructed in one piece. The lightguide 1, which can here again be constructed either only of one material as the core 3 or by putting together two materials as core 3 and cladding 4, is wound once about the two carrier bodies 5, 24 so that curved regions 10 essential for the measurement arise externally on the carrier body 24. In these particularly curved regions 10, in which the lightguide 1 is bent about the carrier body 24, a situation is brought about in which light can emerge on wetting with liquid 7 but still not on contact with air 6.

The embodiment according to FIG. 9 shows a carrier body 25 of a hexagonal material with relatively rounded corners. A lightguide 1 with core 3 and cladding 4 is wound about this so that here also the corresponding conditions are produced in the lightguide at the edges of the carrier body 25 so that on wetting with a corresponding liquid 7 light can emerge. It will be understood that by the selection of various kinds of glass and plastics, matching to the refractive index of the liquid to be measured can be had.

| Reference List | | | |
|---|---|---|---|
| 1 = | lightguide | 14 = | transmitter |
| 2 = | middle axis | 15 = | receiver |
| 3 = | core | 16 = | light ray |
| 4 = | cladding | 17 = | light ray |
| 5 = | carrier body | 18 = | light ray |
| 6 = | air | 19 = | apertures |
| 7 = | liquid | 20 = | knobs |
| 8 = | projections, pegs, or the like | 21 = | recesses |
| | | 22 = | extension pice |
| 9 = | straight regions | 23 = | ridge prism |
| 10 = | curved regions | 24 = | carrier body |
| 11 = | deflecting peg | 25 = | carrier body |
| 12 = | fixing piece | | |

I claim:

1. Apparatus for determining the level of a liquid in a container, channels and the like with a lightguide vertically supported in the liquid by means in the container and having a core of transparent material through which light may be transmitted between a transmitter and a receiver characterized by the lightguide being formed in an undulating manner with a plurality of vertically spaced relatively curved regions connected by relatively straight regions and wherein said curved regions are curved to an extent such that conditions for total internal reflection of light exist there in the presence of ambient air in the container while conditions for total internal reflection of light do not exist there in the presence of the ambient liquid and wherein said relatively straight regions are straight to an extent such that conditions exist for total internal reflection of light in both the presence of the ambient air and ambient liquids.

2. Apparatus in accordance with claim 1 wherein said support means comprises a rod-shaped carrier body formed with projections, pegs, and the like or with apertures upon which said lightguide is mounted.

3. Apparatus in accordance with claim 2 wherein said projections, pegs or apertures have mutually different spacings or sizes.

4. Apparatus in accordance with claim 1 wherein said support means comprises a carrier body and wherein said lightguide is wound onto said carrier body under tension in forming said curved regions.

5. Apparatus in accordance with claim 4 wherein said lightguide is wound onto said carrier body under varying degrees of tension.

6. Apparatus in accordance with claim 1 wherein said support means comprises an irregularly shaped carrier body upon which said lightguide is mounted so as to conform with at least a portion of the shape of said lightguide.

7. Apparatus in accordance with claim 1 wherein said support means comprises a rod-shaped carrier body formed with a series of projections formed in a zig-zag pattern, and wherein said lightguide is wound on said carrier body so as to extend from one end thereof to the other end and back to the one end about said projections.

8. Apparatus in accordance with claim 1 wherein said support means comprises a rod-shaped carrier body formed with a series of projections formed in a zig-zag pattern, and wherein said lightguide is wound on said carrier body so as to extend from one end thereof to the other end about said projections and back to the one end linearly.

* * * * *